(12) United States Patent
Bergmeister et al.

(10) Patent No.: US 6,174,981 B1
(45) Date of Patent: Jan. 16, 2001

(54) POLYMERIZATION PROCESS

(75) Inventors: Joseph J. Bergmeister; Al R. Wolfe; Steven J. Secora; Elizabeth A. Benham; William R. Coutant; Max P. McDaniel, all of Bartlesville, OK (US)

(73) Assignee: Phillips Petroleum Company, Bartlesville, OK (US)

( * ) Notice: Under 35 U.S.C. 154(b), the term of this patent shall be extended for 0 days.

(21) Appl. No.: 09/213,986

(22) Filed: Dec. 17, 1998

(51) Int. Cl.[7] ............................. C08F 210/14; C08F 4/69
(52) U.S. Cl. .................. 526/348.2; 526/106; 526/348; 526/348.5; 526/348.6
(58) Field of Search .................................... 526/106, 348, 526/348.2, 348.5, 348.6, 101

(56) References Cited

U.S. PATENT DOCUMENTS

| | | | |
|---|---|---|---|
| 4,188,471 | 2/1980 | Nasser, Jr. et al. | 526/96 |
| 4,246,139 | 1/1981 | Witt | 252/451 |
| 4,312,967 | 1/1982 | Norwood et al. | 526/64 |
| 4,517,345 | 5/1985 | Eve et al. | 526/105 |
| 4,820,785 | 4/1989 | McDaniel et al. | 526/105 |
| 4,981,831 | 1/1991 | Knudsen et al. | 502/236 |
| 5,115,068 | 5/1992 | Bailey et al. | 526/348.5 |
| 5,208,309 | * 5/1993 | McDaniel et al. | 526/106 X |
| 5,274,056 | 12/1993 | McDaniel et al. | 526/106 |
| 5,399,539 | 3/1995 | Reagan et al. | 502/107 |
| 5,599,887 | 2/1997 | Badley et al. | 526/105 |

* cited by examiner

*Primary Examiner*—Fred Teskin
(74) *Attorney, Agent, or Firm*—Lynda S. Jolly

(57) ABSTRACT

Polymerization processes for ethylene and at least one mono-1-olefin comonomer having from about three to eight carbon atoms per molecule in the presence of a catalyst system comprising chromium supported on a silica-titania support and a trialkylboron compound is provided. Novel ethylene copolymers also are produced.

14 Claims, 3 Drawing Sheets

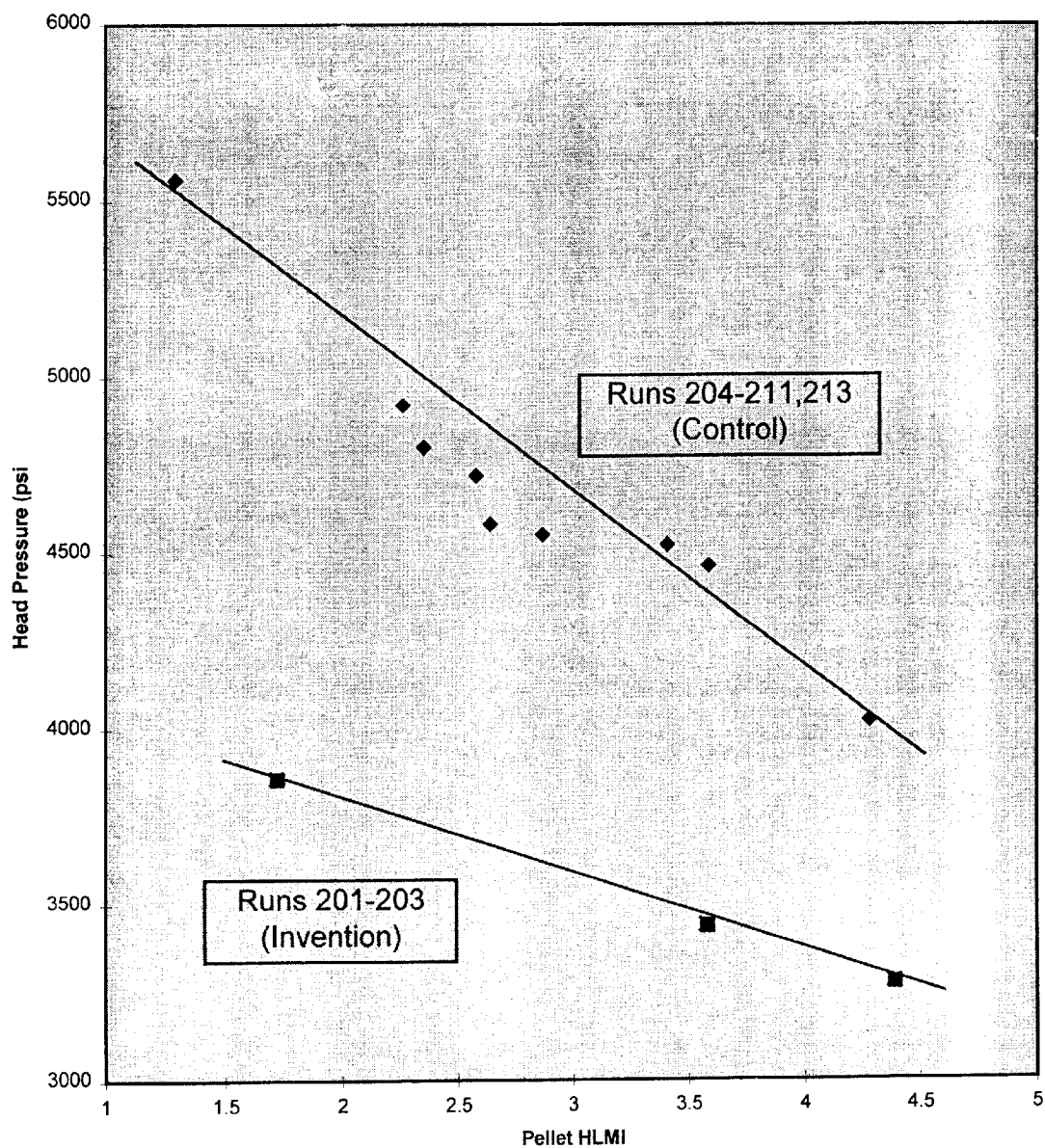

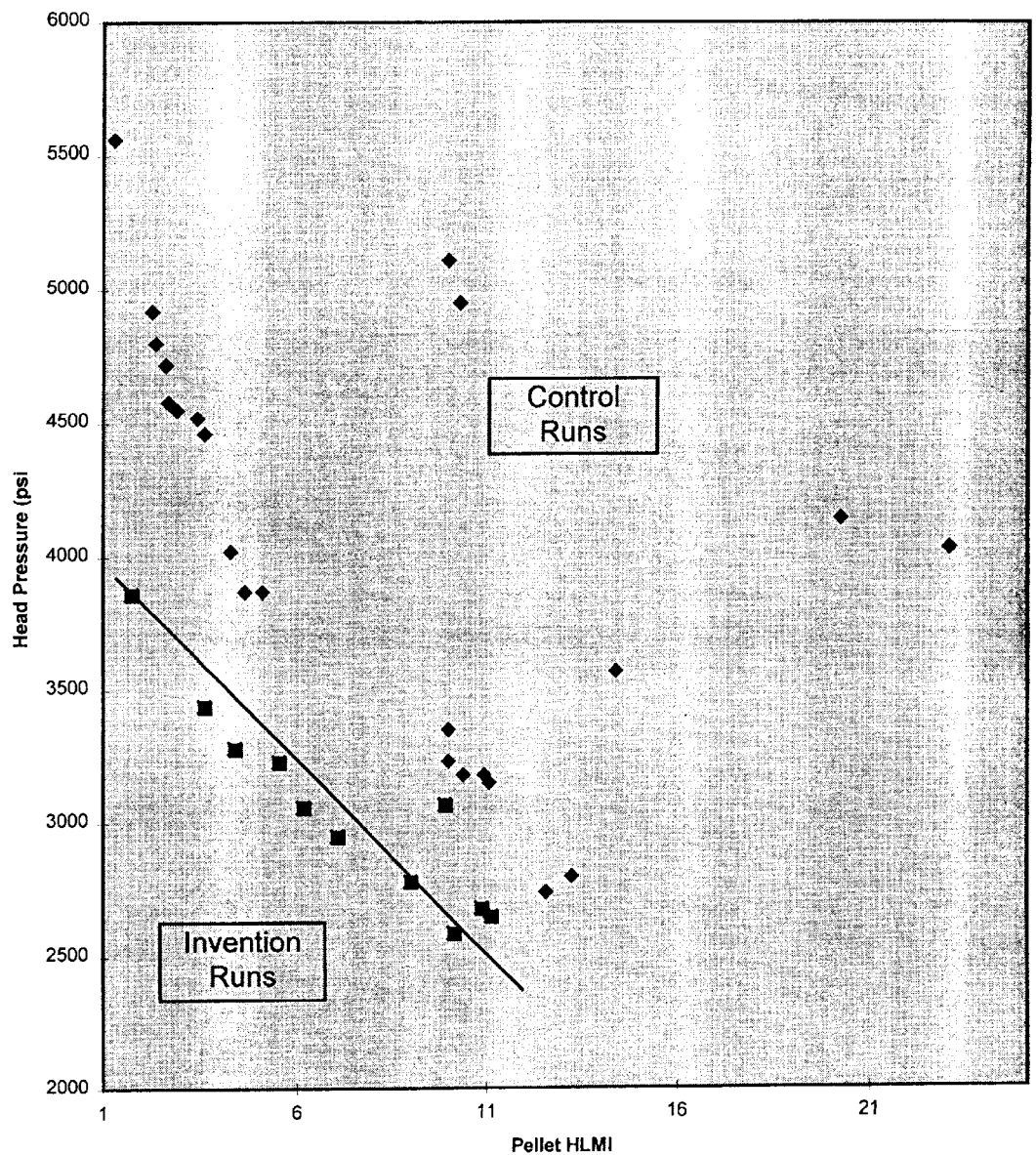
Figure 2: Head Pressure at 120-140 IPM Rate

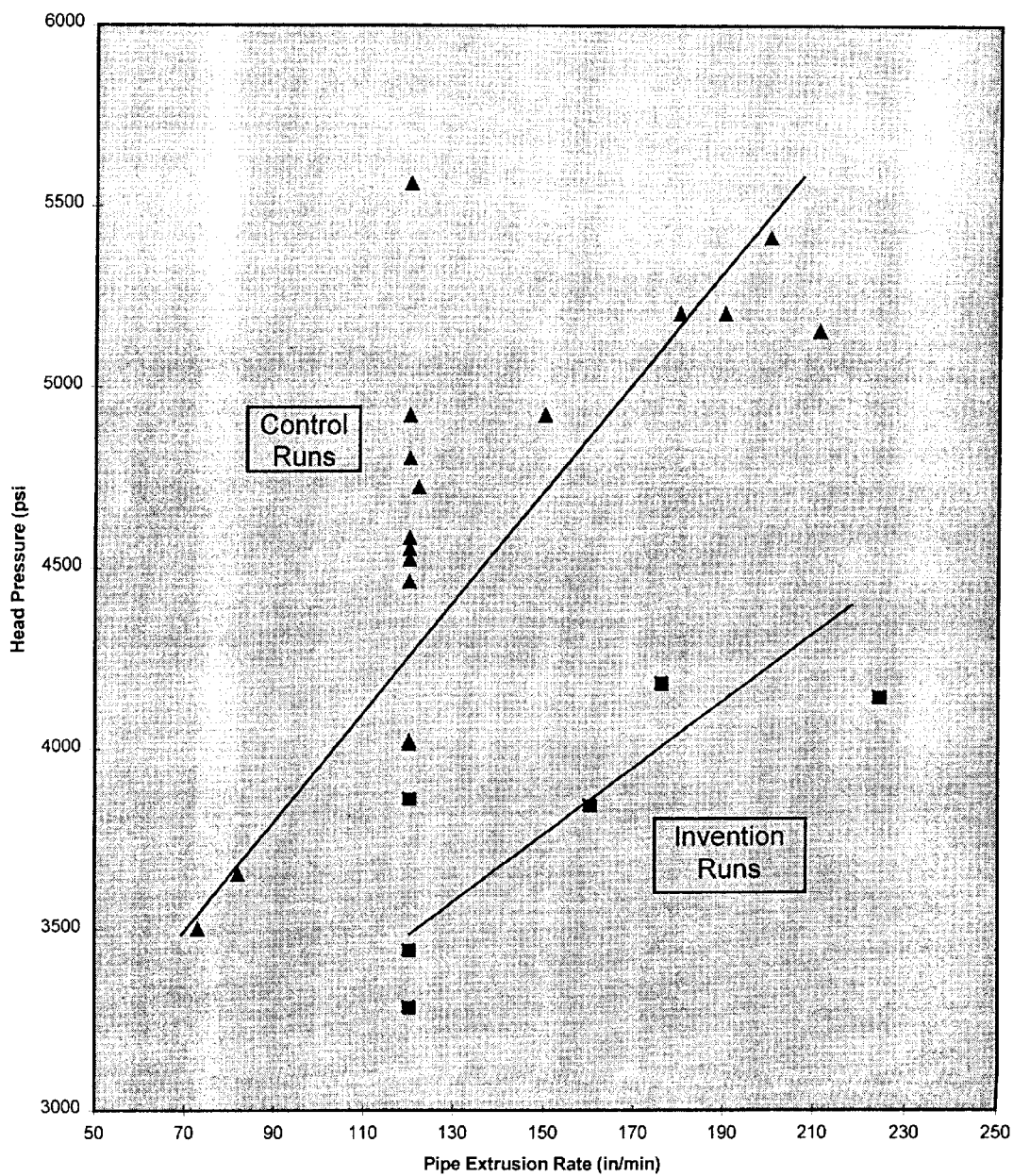
Figure 3: Head Pressure Against Rate for All Resins Having HLMI < 5

POLYMERIZATION PROCESS

BACKGROUND OF THE INVENTION

This invention relates to the polymerization and copolymerization of a mono-1-olefin monomer, such as ethylene, with a higher alpha-olefin comonomer.

Supported chromium catalysts long have been a dominant factor in the production of high density olefin polymers, such a polyethylene. As originally commercialized, these catalyst systems were used in solution polymerization processes. However, it became evident early, that a more economical route to many commercial grades of olefin polymers was a slurry process, that is, a polymerization process carried out at a temperature low enough that the resulting polymer is largely insoluble in the diluent.

It is well known that mono-1-olefins, such as ethylene, can be polymerized with catalyst systems employing vanadium, chromium or other metals impregnated on a support, such as alumina, silica, aluminum phosphate, titania, zirconium, magnesium and other reactor metals. Initially, such catalyst systems primarily were used to form homopolymers of ethylene. It soon developed, however, comonomers such as propylene, 1-butene, 1-hexene or other higher mono-1-olefins were copolymerized with ethylene to provide resins tailored to specific end uses.

One important application for ethylene polymers is the production of pipe. Polyethylene pipe typically is formed from an extrusion process, through a die. Of course, the resultant pipe must be tough and strong enough for appropriate commercial uses. In addition to having excellent physical properties after pipe extrusion, commercially desirable polyethylene pipe resins are those that can be processed at high extrusion rates and still retain these advantageous physical properties in the extruded pipe. In the alternative, a commercially desirable polyethylene resin is one that, at a constant high load melt index (HLMI), exhibits a much lower head pressure on the machine die in order to extend the life of the extrusion equipment. Unfortunately, improvement of one property, such as HLMI, in order to increase extrusion rates can be detrimental to another property, such as toughness, ESCR or polymer density. Additionally, a higher MI can cause pipe properties, such as environmental stress crack resistance (ESCR) and impact strength, to decrease.

SUMMARY OF THE INVENTION

Therefore, it is an object of this invention to provide an improved olefin polymerization process.

It is another object of this invention to provide a process to produce copolymers of ethylene and mono-1-olefins that can be extruded at an increased rate.

It is still another object of this invention to provide a process to produce copolymers of ethylene and mono-1-olefins that can be extruded at a lower head pressure on the machine die.

In accordance with this invention, herein is provided a polymerization process comprising contacting under slurry polymerization conditions at a temperature less than about 200° F. (about 93° C.) in an isobutane diluent:

a) ethylene monomer;

b) at least one mono-1-olefin comonomer having from about three to about eight carbon atoms per molecule;

c) a catalyst system comprising chromium supported on a silica-titania support, where in said support comprises from about 1 to about 10 weight percent titania, based on the weight on the support, and wherein said catalyst system has been activated at a temperature of less than about 1100° F. (about 593° C.) and not subsequently reduced;

d) a cocatalyst which is a trialkylboron compound; and e) recovering an ethylene/mono-1-olefin copolymer.

In accordance with another embodiment of this invention, a copolymer comprising ethylene and a mono-1-olefin having from about 3 to about 8 carbon atoms carbon atoms per molecule is provided, wherein said copolymer has a high load melt index (HLMI) within a range of about 1.5 to about 12 g/10 minutes, a density within a range of about 0.94 to 0.95 g/cc, a weight average molecular weight ($M_w$) greater than about 250,000, a molecular weight distribution ($M_w/M_n$) greater than about 30, an eta (0) greater than about $20\times10^6$, a ratio of eta (0.1)/eta (100) of greater than about 50, and a relaxation time tau of greater than about 4 seconds.

BRIEF DESCRIPTION OF THE DRAWINGS

The following is a brief description of the Figures. All of the Figures are prepared using data from Example 2.

FIG. 1 is a graph of extruder (die) head pressure (psi) vs. HLMI (g/10 mins.), wherein the pipe extrusion rate was 120 inches per minute.

FIG. 2 is a graph of extrusion (die) head pressure (psi) vs. HLMI (g/10 mins.), wherein the pipe extrusion rate was maximized between 120 and 140 inches per minute.

FIG. 3 is a graph of extruder (die) head pressure (psi) vs. pipe extrusion rate (inches/minute) for copolymers having a HLMI of less than 5 g/10 minutes.

DESCRIPTION OF THE PREFERRED EMBODIMENTS

Catalyst

As used in the description herein, the terms "cogel" and "cogel hydrogel" are arbitrarily used to describe cogelled silica and titania. The term "tergel" is used to describe the product resulting from gelation together of silica, titania, and chromium. References to "silica" mean a silica-containing material generally comprised of 80 to 100 weight percent silica, the remainder, if any, being selected from alumina, boria, magnesia, thoria, zirconia, or mixtures thereof Other ingredients which do not adversely affect the catalyst system or which are present to produce some unrelated results also can be present.

The support for the catalyst of this invention must be a cogel of silica and a titanium compound. Such a cogel hydrogel can be produced by contacting an alkali metal silicate such as sodium silicate with an acid, such as carbon dioxide, or an acidic salt. The preferred procedure is to utilize sodium silicate and an acid such as sulfuric acid, hydrochloric acid, or acetic acid, with sulfuric acid being the most preferred due to less corrosivity and greater acid strength. The titanium component must be coprecipitated with silica and thus most conveniently the titanium compound will be dissolved in the acid or alkali metal silicate solution.

The titanium compound preferably is incorporated with the acid. The titanium compound can be incorporated in the acid in any form in which it subsequently will be incorporated in the silica gel formed on combination of the silicate and the acid (preferably by means of adding the silicate to the acid) and from which form it is subsequently convertible to titanium oxide on calcination. Suitable titanium compounds include, but are not limited to, halides such as $TiCl_3$ and $TiCl_4$, nitrates, sulfates, oxalates and alkyl titanates. In instances where carbon dioxide is used, the titanium, of course, must be incorporated into the alkali metal silicate itself. Also when using acidic salts, it is preferred to incorporate the titanium compound in the alkali metal silicate and in such instances, preferred titanium compounds are water soluble materials which do not precipitate the silicate, i.e. are those convertible to titanium oxide on calcination such as, for example, $K_2TiO(C_2O_4)_2 \cdot H_2O$ (titanium potassium oxalate); $(NH_4)_2TiO(C_2O_4)_2 \cdot H_2O$ and $Ti_2(C_2O_4)_3 \cdot H_2O$.

The titanium compound preferably is present in an amount within a range of about 1 to about 10, preferably about 1 to about 8, and most preferably 2 to 8 weight percent, calculated as titanium, based on the weight of the cogel. The preferred titanium ranges result in a catalyst system that can have improved activity and a higher melt index polymer.

The catalyst system of this invention must contain a chromium compound. The chromium compound can be incorporated in accordance with any of several separate methods. First, a tergel can be prepared wherein a chromium compound, as well as a titanium compound, is dissolved in an acidic material or the silicate and thus coprecipitated with the silica. A suitable chromium-containing compound for use in this embodiment, for example, is chromic sulfate.

Another method to incorporate a chromium compound into the catalyst system, is to use a hydrocarbon solution of a chromium compound convertible to chromium oxide to impregnate the support after it is spray dried or azeotrope dried (i.e., a xerogel). Exemplary of such materials are tert-butyl chromate, chromium acetylacetonate, and the like. Suitable solvents include, but are not limited to, pentane, hexane, benzene, and the like. Surprisingly, an aqueous solution of a chromium compound simply can be physically mixed with the support. These types of catalyst systems are disclosed in U.S. Pat. No. 3,887,494, herein incorporated by reference.

Chromium preferably is present in an amount within a range of about 0.8 to about 3 weight percent, more preferably within a range of about 1.5 to about 2.5 weight percent chromium calculated as $CrO_3$, based on the total weight of the catalyst system (support plus chromium compound). These ranges of chromium content provide a catalyst system that is excellent in activity.

Catalyst systems used in accordance with processes of this invention must be calcined. Calcination can take place by heating the dried catalyst system in the presence of an excess of molecular oxygen at a temperature less than about 1100° F. (about 593° C.), preferably within a range of about 900° F. to 1100° F. (about 482° C. to about 593° C.). Most preferably, the catalyst system is calcined at a temperature within a range of about 1000° F. to about 1100° F. (about 538° C. to about 593° C.) for about 30 minutes to about 50 hours, more preferably for about 2 to about 10 hours. Calcination at temperatures above 1100° F. or below 900° F. can produce a polymer product having inferior properties. The calcination procedure results in at least a substantial portion of the chromium in a low valence state to be converted to a hexavalent form. Preferably, calcination is carried out in a stream of fluidizing air wherein the stream of fluidizing air is continued as the material is cooled.

Catalyst systems of this invention must be used with a trialkylboron cocatalyst. Exemplary trialkylboron compounds include those wherein each alkyl group has from about 1 to about 10 carbon atoms, preferably about 2 to about 4 carbon atoms per group. Trialkylboron compounds must be used as a cocatalyst because these compounds are effective agents to improve polymer properties. By far, due to ease of use, availability and best product properties, the most preferred cocatalyst is triethylboron.

The cocatalyst is used in an amount within a range of about 1 to about 6 parts per million (ppm), or milligrams per kilogram (mg/kg), based on the amount of diluent in the reactor. Preferably, the cocatalyst is present in an amount within a range of about 2 to about 4 ppm, for cost effectiveness and best polymer properties.

Reactants

Catalyst systems of this invention can be used to polymerize ethylene and one or more comonomers selected from the group consisting of alpha-olefins containing from about 3 to about 8 carbon atoms per molecule. Exemplary comonomers include aliphatic mono-1-olefins, such as propylene, 1-butene, 1-pentene, 1-hexene, 4-methyl-1-pentene, 1-octene and other alpha-olefins and non-conjugated diolefins such as 1,4-pentadiene, 1,5-hexadiene, and other such diolefins and mixtures thereof. Propylene, 1-butene, 1-pentene, 1-hexene and 1-octene are especially preferred comonomers for use with ethylene with 1-hexene being most preferred due to resultant polymer properties. The invention is of particular applicability in producing ethylene copolymers from mixtures of ethylene and about 0.5 to about 20 mole percent of one or more comonomers Ethylene copolymers preferably constitute at least about 90, preferably 97 to 99.8 mole percent polymerized ethylene units. With ethylene/1-hexene copolymers, about 98 to 99.8 mole percent ethylene is preferred, the remainder of course being comonomer.

Polymerization

Catalyst systems of this invention must be used in slurry polymerization processes. A slurry, or particle form, process generally is carried out in an inert diluent (medium). The diluent useful in the practice of this invention must be isobutane. While other diluents are known or even can be used, other diluents will not result in a decreased die swell and decreased weight swell as disclosed in this invention.

The temperature of the slurry reactor must be below 200° F. (93° C.). Temperatures above 200° F. will not result in a polymer having the required resultant properties. Pressures in the particle form process can vary from about 500 to about 700 psi (0.76 to 4.8 MPa) or higher. Preferably, reactor temperatures are within a range of about 180° F. to 200° F. (82° C. to 93° C.), for the reasons given above.

The catalyst system is kept in suspension and is contacted with the monomer(s) at sufficient pressure to maintain the isobutane and at least a portion of the monomer(s) in a liquid phase. The pressure and temperature thus are selected such that the polymer is produced as solid particles and is recovered in that form. Catalyst system concentrations can be such that the catalyst content ranges from about 0.001 to about 1 weight percent, based on the weight of the reactor contents.

Hydrogen can be added to the slurry polymerization process to control molecular weight, as is known in the prior art. When used, hydrogen generally is used at concentrations up to about 2 mole percent of the reaction mixture, preferably within a range of about 0.1 to about 1 mole percent of reaction mixture.

Product

Polymers produced in accordance with this invention must be a copolymer of ethylene and at least one higher alpha-olefin The comonomer, or higher alpha-olefin, is present in the polymerization reactor in an amount within a range of about 0.2 to about 5 mole percent.

The polymer, or resin product, generally has a density within a range of about 0.94 to about 0.95 g/cc, preferably within a range of about 0.942 to about 0.948 g/cc. Most preferably, polymer product density is within a range of 0.943 to 0.947 g/cc. The HLMI of the resultant polymer generally is within a range of about 1.5 to about 12 g/10 minutes, preferably about 2 to about 10 g/10 minutes. Most preferably, the HLMI is within a range of 3 to 7 g/10 minutes.

Polymers produced in accordance with this invention also have a broad molecular weight distribution, as evidenced by the ratio of $M_w/M_n$, wherein $M_w$ is the weight average molecular weight and $M_n$ is the number average molecular weight. Usually, $M_w/M_n$ is greater than about 30, preferably within a range of about 30 to about 50. Most preferably, the $M_w/M_n$ is within a range of 40 to 50.

The following examples are provided to further assist a person skilled in the art with understanding the invention. The particular reactants, conditions, and other variables are intended to be generally illustrative of these inventions and are not meant to be construed to be unduly limiting the reasonable scope of the invention.

EXAMPLES

Example 1

Ethylene and higher alpha-olefin copolymers were prepared under continuous particle form process conditions, comprising contacting catalyst system with monomers, employing a liquid fill loop reactor, having a volume of 23 gallons (87 liters), isobutane as the diluent, and occasionally some hydrogen, as shown in the following Examples. The reactor was operated to have a residence time of 1.25 hrs. The reactor temperature was varied over the range of 180° F. to 220° F. (82° C. to 105° C.), unless shown differently, and the pressure was 530 psig. At steady state conditions, the isobutane feed rate was 54 lbs/hr, the ethylene feed rate was about 24 lbs/hr, and the 1-hexene comonomer feed rate was varied to control the density of the product polymer.

Various polymerization catalyst systems were used in each of the Runs. All catalyst systems were loaded with about one (1) weight percent chromium, unless otherwise indicated. 963 and 964 Magnapore are two polymerization catalyst systems commercially available from Davison Chemical Company, a division of W.R. Grace & Co., prepared in accordance with U.S. Pat. Nos. 3,887,494; 3,900,457; and 4,119,569, all herein incorporated by reference. 964 Magnapore contained 5 weight % titanium and 963 Magnapore contained 2.5 weight % titanium. 965 Sylopore is a polymerization catalyst system commercially available from Davison Chemical Company, prepared in accordance with U.S. Pat. No. 4,981,831, herein incorporated by reference. "$AlPO_4$" is a designation for a polymerization catalyst system having an almninophosphate (P/Al mole ratio of 0.4, unless otherwise indicated) support, commercially available from Davison Chemical Company, prepared in accordance with U.S. Pat. No. 4,364,842, herein incorporated by reference. "Ti/HA30W" is a polymerization catalyst system made by adding 3 weight % titanium to a catalyst system commercially available from Davison Chemical Company as HA30. Titanium was added as a heptane solution of titanium tetra isopropoxide. Various activation temperatures are shown for the catalyst systems used.

Cocatalysts, if used, were either triethylboron (TEB) or triethylaluminum (TEA). Polymer was removed from the reactor at the rate of 22 lbs/hr. Polymer product was collected from each run and tested according to the following procedures:

Density (g/ml): ASTM D 1505-68 and ASTM D 1928, Condition C. Determined on a compression molded sample, cooled at about 15° C. per minute, and conditioned at room temperature for about 40 hours.

High Load Melt Index (HLMI)(g/10 min): ASTM D1238, condition E. Determined at 190° C. with a 21,600 gram weight.

Molecular Weight Distribution ($M_w/M_n$): Molecular weights and molecular weight distributions were obtained using a Waters 150 CV gel permeation chromatograph with trichlorobenzene (TCB) as the solvent, with a flow rate of 1 mL/minute at a temperature of 140° C. BHT (2,6-di-tert-butyl4-methylphenol) at a concentration of 1.0 g/L was used as a stabilizer in the TCB. An injection volume of 220 μL was used with a nominal polymer concentration of 0.3 g/l (at room temperature). Dissolution of the sample in stabilized TCB was carried out by heating at 160–170° C. for 20 hours with occasional, gentle agitation. The column was two Waters HT-6E columns (7.8×300mm). The columns were calibrated with a broad linear polyethylene standard (Phillips Marlex® BHB 5003) for which the molecular weight had been determined.

Rheological data was obtained from a Rheometrics Dynamic Spectrometer (Model RDS-7700) at 190° C. under a nitrogen atmosphere. Polyethylene samples first were compression molded into plaques at 180° C. Rheological measurements were then made on disk shaped samples which were punched from the plaques. Viscosity was taken at shear rates of 0.1 to 100 $sec^{-1}$. The ratio of the two is shown as an indication of the shear response of the resin. A high eta ratio indicates that the molten polymer flows well under pressure, and is sometimes taken as one indication of the breadth of the molecular weight distribution. The viscosity/shear rate curve was then fitted to the Yashida-Carreau equation, from which the relaxation time for the polymer (tau) was obtained. Tau can be considered as an indication fo the degree of "memory" which the polymer is capable of. A high tau indicates that, once sheared, the resin takes a long time to recover. Eta(0), another indication of molecular weight, was obtained by extrapolation.

The following pipe resins shown in Table 1 were tested for pipe extrusion. Information about each of the Runs and the results of each Run are given in Table 1. All resins were extruded into a 1 inch diameter pipe at a rate of approximately 120–140 inches per minute. The head pressure needed to make the resin flow under the conditions is shown. A lower head pressure is an indication of an easier processing resin. Obviously, the HLMI of the resin also effects head pressure since a lower HLMI should be more difficult to process. Notice however, that Runs 101–107 generally exhibit lower head pressure for a given HLMI than Runs 108–116.

TABLE 1

Polymers of similar HLMI and density made from various catalysts & reactor conditions

| Run | Catalyst | Catalyst Activation Temp (° F.) | Cocat. | Cocatalyst Amount, ppm | HLMI, g/10 min | Density, g/cc | Pipe Extrustion Rate, in/min | Head Pres., lbs | Mw × $10^3$ | Mw/Mn | eta (0) | eta (0.1) | eta (100) | eta Ratio (0.1/100) | tau (eta) |
|---|---|---|---|---|---|---|---|---|---|---|---|---|---|---|---|
| 101 | 964 Magnapore | 1000 | TEB | 2.0 | 9.0 | 0.943 | 142 | 2780 | 260 | 35 | 36.39 | 13.09 | 1.50 | 87 | 10.4 |
| 102 | 963 Magnapore | 1000 | TEB | 2.0 | 10.9 | 0.9445 | 132 | 2680 | 310 | 39 | 39.90 | 13.00 | 1.78 | 73 | 6.9 |
| 103 | 963 Magnapore | 1000 | TEB | 2.0 | 11.1 | 0.946 | 132 | 2650 | 310 | 45 | 34.90 | 12.90 | 1.79 | 72 | 5.8 |
| 104 | Sylopore | 1100 | TEB | 2.0 | 11.1 | 0.945 | 132 | 2650 | 220 | 22 | 21.10 | 10.98 | 1.80 | 61 | 2.5 |
| 105 | 963 Magnapore | 1000 | TEB | 1.0 | 5.5 | 0.9434 | 120 | 3230 | 330 | 41 | 38.10 | 19.70 | 2.34 | 84 | 6.4 |
| 106 | 963 Magnapore | 1000 | TEB | 2.0 | 6.2 | 0.948 | 120 | 3060 | 330 | 42 | 46.20 | 16.90 | 1.95 | 87 | 10.0 |
| 107 | 963 Magnapore | 1000 | TEB | 2.2 | 7.1 | 0.943 | 120 | 2950 | 370 | 62 | 24.90 | 14.80 | 1.93 | 77 | 4 |
| 108 | 963 Magnapore | 1200 | TEB | 2.0 | 9.9 | 0.942 | 142 | 3068 | 180 | 16 | 4.58 | 8.52 | 1.92 | 44 | 0.3 |
| 109 | 963 Magnapore | 1000 | TEA | 2.0 | 10.9 | 0.945 | 132 | 3180 | 310 | 25 | 2.78 | 8.81 | 2.29 | 38 | 0.1 |
| 110 | AlPO$_4$ | 1100/700 | — | — | 12.6 | 0.944 | 132 | 2740 | 170 | 18 | 20.70 | 9.27 | 1.99 | 47 | 1.1 |
| 111 | 963 Magnapore | 1000 | TEA | 2.0 | 5.1 | 0.946 | 120 | 3870 | 280 | 24 | 8.90 | 13.90 | 2.70 | 51 | 0.6 |
| 112 | 963 Magnapore | 1200 | — | — | 4.6 | 0.941 | 142 | 3870 | 300 | 18 | 8.64 | 13.05 | 2.25 | 58 | 0.8 |
| 113 | 963 Magnapore | 1100 | — | — | 6.4 | 0.946 | 126 | FX | 240 | 18 | 3.10 | 10.14 | 2.48 | 41 | 0.15 |
| 114 | AlPO$_4$ | 1100/700 | TEB | 1 | 21.4 | 0.946 | 118 | FX | 260 | 29 | FX | FX | EX | FX | FX |
| 115 | Ti/HA30W | 1100 | — | — | 20. | 0.943 | 128 | 4140 | 250 | 18 | 1.946 | 7.229 | 2.086 | 35 | 0.08 |
| 116 | 963 Magnapore | 1200 | — | — | 14 | 0.945 | 131 | 3350 | 170 | 10 | 1.18 | 7.11 | 2.28 | 31 | 0.04 |

Comparison of Runs 101–107 with 108–116 shows that only the combination of TEB cocatalyst with 1000° F. activated chromium on silica/titiana provides resultant polymers with the desired physical characteristics and properties. Run 110, wherein aluminophosphate was the support, provides a polymer with inferior pipe extrusion characteristics.

Example 2

The Runs shown in Table 2 were made in a similar manner to those in Table 1 using various catalyst systems; however, the Runs in this Example generally have lower HLMI values. The resins produced in this Example were extruded under two different pipe extrusion conditions. The first test was done under standard extrusion conditions at a rate of 120 inches per minute and the head pressure was recorded. In the second test, resins were extruded at the maximum output rate possible and this rate was recorded.

pressure than the other Runs, even at the higher rates tested. This lower head pressure is another indication of easy processability.

FIG. 3 plots extruder head pressure (psi) against pipe extrusion rate (inches/min) for resins having an HLMI value of less than 5 g/10 minutes for data in both Tables 1 and 2. In theory, higher rates of extrusion should result in the generation of higher pressure. However, this ignores the effect of HLMI, which also can affect head pressure. The data in FIG. 3 are only results from Table 2 which have lower and somewhat similar HLMI values. FIG. 3 shows that, in spite of some HLMI variations, there is a clear demarcation between Runs 201–203 and other Runs. Again, Runs 201–203 process more easily than the other Runs.

While this invention has been described in detail for the purpose of illustration it is not to be construed or limited

TABLE 2

| Run | Catalyst | Catalyst Activation Temp (° F.) | Cocatalyst | HLMI, g/10 min | Standard Extrusion Rate, in/min | Standard Head Pres., psi | Maximum Extrusion Rate in/min | Maximum Head Pres., psi |
|---|---|---|---|---|---|---|---|---|
| 201 | 963 Magnapore | 1000 | TEB | 4.39 | 120 | 3280 | 224 | 4140 |
| 202 | 964 Magnapore | 1000 | TEB | 1.72 | 120 | 3860 | 176 | 4180 |
| 203 | Sylopore | 1000 | TEB | 3.58 | 120 | 3440 | 160 | 3840 |
| 204 | Sylopore | 1100/700 | — | 1.29 | 120 | 5560 | 120 | 5560 |
| 205 | 0.3 AlPO$_4$ | 1100/700 | — | 3.41 | 120 | 4520 | 180 | 5200 |
| 206 | 969ID | 1100 | — | 2.26 | 120 | 4920 | 120 | 4920 |
| 207 | 2% Cr963 Magnapore | 1000 | TEA | 2.87 | 120 | 4550 | — | — |
| 208 | 963 Magnapore | 1000 | TEA | 2.58 | 122 | 4720 | 190 | 5200 |
| 209 | 963 Magnapore | 1000 | TEA | 4.28 | 120 | 4020 | 211 | 5150 |
| 210 | 963 Magnapore | 1100 | TEA | 2.64 | 120 | 4580 | 150 | 4920 |
| 211 | 963 Magnapore | 1100 | TEA | 3.59 | 120 | 4460 | 200 | 5410 |
| 212 | 963 Magnapore | 1100 | TEA | 3.59 | 73 | 3500 | — | — |
| 213 | 963 Magnapore | 1100 | TEA | 3.59 | 82 | 3650 | 120 | 4010 |

The data in Table 2 shows that the maximum extrusion rate is improved in Runs 201–203.

Further analysis of the data in Table 2 is simplified by reference to the Figures. FIG. 1 plots extruder head pressure (psi) against resin HLMI, wherein the extrusion rate was 120 inches per minute. Note that Run 212 was not run at 120 psi head pressure and therefor is not shown in FIG. 1. HLMI is related to head pressure (psi), in that resins having lower HLMI will extrude with higher head pressure. FIG. 1 shows that two sets of lines result from the data in Table 2. Runs 201–203 process more easily at HLMI values made within a range of I to 5 g/10 mins, as compared with appropriate control runs. If the data from Table 1 were included in a similar figure, similar results are observed.

FIG. 2 plots extruder head pressure (psi) against HLMI wherein the extrusion rate is maximized between 120 and 140 inches per minute for data in both Tables 1 and 2. FIG. 2 shows that Runs 201–203 exhibit considerably lower head thereby. This detailed description is intended to cover all changes and modifications within the spirit and scope thereof.

That which is claimed is:

1. A polymerization process comprising contacting under slurry polymerization conditions at a temperature less than about 200° F. (about 93° C.) in an isobutane diluent:

a) ethylene monomer;

b) at least one mono-1-olefin comonomer having from about three to about eight carbon atoms per molecule;

c) a catalyst system comprising chromium supported on a silica-titania support wherein said support comprises from about 1 to about 10 weight percent titania, based on the weight on the support, and wherein said catalyst system has been activated at a temperature of less than about 1100° F. (about 593° C.) and not subsequently reduced;

d) a cocatalyst which is a trialkylboron compound; and e) recovering an ethylene/mono-1-olefin copolymer.

2. A process according to claim 1 wherein said comonomer is selected from the group consisting of propylene, 1-butene, 1-pentene, 1-hexene, 1-octene, and mixtures thereof.

3. A process according to claim 2 wherein said comonomer is 1-hexene.

4. A process according to claim 1 wherein said reactor temperature is within a range of about 180° F. to 200° F.

5. A process according to claim 1 wherein said titania of the silica-titania support is coprecipitated with the silica.

6. A process according to claim 1 wherein said titania is present in an amount within a range of 2 to 8 weight percent titanium, based on the weight of the silica-titania support.

7. A process according to claim 1 wherein said catalyst system is calcined at a temperature within a range of about 900° F. to about 100° F.

8. A process according to claim 1 wherein said trialkyboron cocatalyst is present in the reactor in an amount within a range of 2 to about 4 mg/kg.

9. A composition comprising a copolymer of ethylene and a mono-1-olefin having from about 3 to about 8 carbon atoms carbon atoms per molecule, wherein said copolymer has a high load melt index (HLMI) within a range of about 1.5 to about 12 g/10 minutes, a density within a range of about 0.94 to 0.95 g/cc, a weight average molecular weight ($M_w$) greater than about 250,000, a molecular weight distribution ($M_w/M_n$) greater than about 30, an eta (0) greater than about $20 \times 10^6$, a ratio of eta (0.1)/eta (100) of greater than about 50, and a relaxation time tau of greater than about 4 seconds.

10. A composition according to claim 9 wherein said mono-1-olefin is 1-hexene.

11. A composition according to claim 9 wherein said high-load melt index is within a range of 3 to 7 grams/10 minutes.

12. A composition according to claim 9 wherein said molecular weight distribution ($M_w/M_n$) is within a range of about 30 to about 50.

13. A polymerization process comprising contacting under slurry polymerization conditions at a temperature within a range of 180° F. to 200° F. in an isobutane diluent:

a) ethylene monomer;

b) 1-hexene comonomer;

c) a catalyst system comprising chromium supported on a silica-titania support, wherein said support comprises from about 1 to about 10 weight percent titania, based on the weight of the support, and wherein said catalyst system has been activated at a temperature within a range of 900° F. to 1100° F. and not subsequently reduced;

d) a triethylboron cocatalyst; and e) recovering an ethylene/1-hexene copolymer.

14. A composition comprising ethylene and 1-hexene, wherein said copolymer has a high load melt index (HLMI) within a range of 3 to 7 g/10 minutes, a density within a range of about 0.94 to 0.95 g/cc, a weight average molecular weight ($M_w$) greater than about 250,000, a molecular weight distribution ($M_w/M_n$) within a range of 30 to 50, an eta (0) greater than about $20 \times 10^6$, a ratio of eta (0.1)/eta (100) of greater than about 50, and a relaxation time tau of greater than about 4 seconds.

* * * * *